(12) United States Patent
Bhattacharyya et al.

(10) Patent No.: US 10,116,963 B1
(45) Date of Patent: Oct. 30, 2018

(54) VECTOR-BASED ENCODING TECHNIQUE FOR LOW-BANDWIDTH DELIVERY OR STREAMING OF VECTORIZABLE VIDEOS

(71) Applicant: DOT LEARN INC., Edison, NJ (US)

(72) Inventors: Samrat Bhattacharyya, Edison, NJ (US); Babatunde Alawode, Edison, NJ (US)

(73) Assignee: DOT LEARN INC., Edison, NJ (US)

( * ) Notice: Subject to any disclaimer, the term of this patent is extended or adjusted under 35 U.S.C. 154(b) by 0 days.

(21) Appl. No.: 15/902,352

(22) Filed: Feb. 22, 2018

Related U.S. Application Data (60) Provisional application No. 62/517,934, filed on Jun. 11, 2017.

(51) Int. Cl.
| | |
|---|---|
| *H04N 19/593* | (2014.01) |
| *H04N 19/59* | (2014.01) |
| *G06F 17/21* | (2006.01) |
| *G06K 9/00* | (2006.01) |
| *H04L 29/08* | (2006.01) |
| *G06F 3/0354* | (2013.01) |

(52) U.S. Cl.
CPC ......... *H04N 19/593* (2014.11); *G06F 17/218* (2013.01); *G06K 9/00416* (2013.01); *H04N 19/59* (2014.11); *G06F 3/03545* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 2004/0202371 | A1* | 10/2004 | Kodama | H04N 19/30 382/232 |
| 2010/0295796 | A1* | 11/2010 | Roberts | G06F 3/0412 345/173 |
| 2012/0188281 | A1* | 7/2012 | Nishina | G01C 21/20 345/634 |
| 2012/0206349 | A1* | 8/2012 | Nowatzyk | G06F 3/0321 345/158 |
| 2014/0002504 | A1* | 1/2014 | Farmer | G09G 5/00 345/660 |
| 2015/0153855 | A1* | 6/2015 | Bathiche | G06F 3/0416 345/173 |
| 2015/0301726 | A1* | 10/2015 | Mattiuzzo | G06F 3/041 345/173 |

\* cited by examiner

*Primary Examiner* — Frederick D Bailey
(74) *Attorney, Agent, or Firm* — Lando & Anastasi, LLP (57) ABSTRACT

Aspects of the present invention include a method of encoding a media file. The method includes acts of receiving a video stream depicting at least one object being drawn on a drawing surface, detecting, in the video stream, at least one path representing the at least one object, storing a plurality of coordinate sets representing the at least one path, identifying a subset of the plurality of coordinate sets that represents the at least one path to a degree of accuracy exceeding a defined threshold, and storing the subset of the plurality of coordinate sets in a text file format.

20 Claims, 9 Drawing Sheets

VECTOR-BASED ENCODING TECHNIQUE FOR LOW-BANDWIDTH DELIVERY OR STREAMING OF VECTORIZABLE VIDEOS

CROSS-REFERENCE TO RELATED APPLICATIONS

This application claims priority under 35 U.S.C. § 119(e) to U.S. Provisional Application Ser. No. 62/517,934, titled "VECTOR BASED ENCODING TECHNIQUE FOR LOW-BANDWIDTH DELIVERY OR STREAMING OF VECTORIZABLE VIDEOS," filed on Jun. 11, 2017, which is hereby incorporated by reference in its entirety.

FIELD OF TECHNOLOGY

The disclosure relates to video encoding in general, and more particularly, to compact encoding in low-bandwidth environments.

SUMMARY

Aspects and embodiments disclosed herein relate to a method of encoding a media file. The method includes acts of receiving a video stream depicting at least one object being drawn on a drawing surface, detecting, in the video stream, at least one path representing the at least one object, storing a plurality of coordinate sets representing the at least one path, identifying a subset of the plurality of coordinate sets that represents the at least one path to a degree of accuracy exceeding a defined threshold, and storing the subset of the plurality of coordinate sets in a text file format.

In one embodiment, storing the plurality of coordinate sets representing the at least one path includes storing one or more of a first position coordinate, a second position coordinate, and a time coordinate. In at least one embodiment, the method includes executing a spline interpolation function to determine an interpolated path represented by the subset of the plurality of coordinate sets.

In some embodiments, identifying the subset of the plurality of coordinate sets that represents the at least one path to the degree of accuracy exceeding the defined threshold includes acts of identifying a first coordinate set of the plurality of coordinate sets, determining a path length of the interpolated path represented by the subset of the plurality of coordinate sets, the subset of the plurality of coordinate sets not including the first coordinate set of the plurality of coordinate sets, determining that the path length of the interpolated path satisfies a first criterion, and removing the first coordinate set from the plurality of coordinate sets.

In one embodiment, determining that the path length of the interpolated path satisfies the first criterion includes determining that the path length of the interpolated path is within a threshold range from the path length of the at least one object. In some embodiments, identifying the first coordinate set includes identifying at least one coordinate set which produces a greatest sum of squared errors of the plurality of coordinate sets. In at least one embodiment, the at least one object is drawn by a stylus and the at least one path is a path traveled by the stylus.

In some embodiments, the method includes an act of executing a motion prediction function to predict the at least one path drawn by the stylus. In one embodiment, the method includes an act of converting the text file format to a binary file format. In at least one embodiment, the text file format is one of an XML file format and a JSON file format.

According to one aspect of the disclosure, a non-transitory computer-readable medium storing sequences of computer-executable instructions for encoding a media file is provided. The sequences of computer-executable instructions include instructions that instruct at least one processor to receive a video stream depicting at least one object being drawn on a drawing surface, detect, in the video stream, at least one path representing the at least one object, store a plurality of coordinate sets representing the at least one path, identify a subset of the plurality of coordinate sets that represents the at least one path to a degree of accuracy exceeding a defined threshold, and store the subset of the plurality of coordinate sets in a text file format.

In one embodiment, storing the plurality of coordinate sets representing the at least one path includes storing one or more of a first position coordinate, a second position coordinate, and a time coordinate. In some embodiments, the sequences of computer-executable instructions include instructions which are further configured to instruct the at least one processor to execute a spline interpolation function to determine an interpolated path represented by the subset of the plurality of coordinate sets.

In at least one embodiment, the sequences of computer-executable instructions include instructions which are further configured to instruct the at least one processor to identify a first coordinate set of the plurality of coordinate sets, determine a path length of the interpolated path represented by the subset of the plurality of coordinate sets, the subset of the plurality of coordinate sets not including the first coordinate set of the plurality of coordinate sets, determine that the path length of the interpolated path satisfies a first criterion, and remove the first coordinate set from the plurality of coordinate sets.

In one embodiment, determining that the path length of the interpolated path satisfies the first criterion includes determining that the path length of the interpolated path is within a threshold range from the path length of the at least one object. In some embodiments, identifying the first coordinate set includes identifying at least one coordinate set which produces a greatest sum of squared errors of the plurality of coordinate sets. In at least one embodiment, the at least one object is drawn by a stylus and the at least one path is a path traveled by the stylus.

In an embodiment, the sequences of computer-executable instructions further include instructions which are further configured to instruct the at least one processor to execute a motion prediction function to predict the at least one path drawn by the stylus. In one embodiment, the sequences of computer-executable instructions include instructions which are further configured to instruct the at least one processor to convert the text file format to a binary file format. In some embodiments, the text file format is one of an XML file format and a JSON file format.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Modern computer monitors are capable of displaying, in quick succession, the many still-image frames making up a digital video. Above a certain frame rate, the human eye perceives the rapid succession of still-image frames as a moving picture. For example, many videos are displayed at approximately 24-30 Frames Per Second (FPS), which appears to viewers as a moving scene. In existing approaches, individual frames in a video may be stored in one of several image formats, including, for example, a pixel-based format. In some pixel-based formats, the output of each pixel of each frame in the video is stored as three bytes, each byte corresponding to a color channel (i.e., red, green, and blue). For a frame having the dimensions 1080×1920 pixels, each frame requires 3×1080×1920=6,220,800 bytes of storage. Although videos represented in the pixel-based format are capable of being compressed, storage requirements increase rapidly as videos are displayed at 24-30 FPS.

Alternatively, embodiments discussed herein utilize text-based files that describe videos parametrically, rather than directly storing a pixel value for every successively-displayed image in a series of images. For example, certain embodiments may include a .ZIP file comprising a JSON-encoded text file. The text file may describe a vector-based graphic, and may further describe how the vector-based graphic evolves (for example, in terms of orientation, size, and so forth) over time. For exemplary purposes only, .ZIP files storing JSON-encoded text files are referred to herein as ".lrn files" or ".lrn video files."

For videos displaying relatively simple shapes, .lrn video files generally have lower storage requirements than pixel-based video files. Conversely, for videos displaying more complex shapes (for example videos depicting a person speaking), pixel-based video files may have lower storage requirements. As discussed in greater detail below, it may be advantageous to display "chalkboard-style" learning videos using .lrn video files rather than pixel-based video files where reduced storage requirements are advantageous. Modifications and improvements to .lrn-based chalkboard-style videos are disclosed which provide various advantages to the generation, storage, and distribution of such videos.

Figure 1:
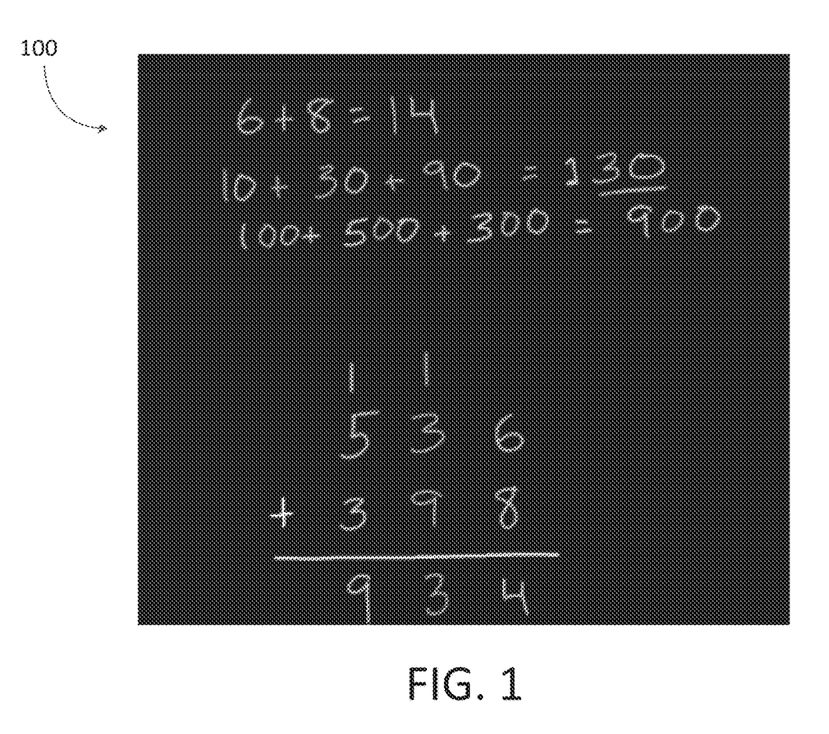
FIG. 1 illustrates a view of a chalkboard-style educational video.

FIG. 1 illustrates a frame 100 of a chalkboard-style learning video. Chalkboard-style learning videos are educational videos designed to present information through a digital medium that is reminiscent of a traditional physical chalkboard. To create a video, a user uses an input device such as a tablet computer to draw alphanumeric characters that will appear on a display screen. In another example, a fixed camera may capture video of a user drawing on an actual surface, such as a whiteboard or chalkboard.

The user may also record an audio recording to be played with the video display. For example, the user may write out a solution to a mathematical problem on a tablet computer with a stylus while narrating the video into a microphone connected to the tablet computer. The video and audio files may be stored and subsequently played back synchronously to users. As used herein, the term "video" may be used to refer to both the visual and audio signals presented to a user.

The .lrn files discussed above may be particularly advantageous in the context of chalkboard-style learning videos. As discussed above, .lrn files generally require less storage than pixel-based video files for displaying simple shapes such as polygons, curves, curved shapes, and lines. Alphanumeric characters, such as those illustrated in the frame 100, may be considered to be simple shapes where each character is represented by a fixed-width, single-color line.

Accordingly, chalkboard-style learning videos stored in a .lrn format may have significantly reduced storage requirements compared to videos stored in a pixel-based format. The ability to provide educational videos with minimal storage requirements may be advantageous in regions lacking hardware capable of storing large amounts of data, or lacking Internet connections capable of sustaining data-intensive pixel-based video streaming. For example, 4G is not expected to reach the majority of Africa for at least 10 years. The present disclosure provides solutions capable of providing educational content that is compatible with existing network infrastructure technology in various developing countries, allowing for the delivery of such content without awaiting improvements to local network infrastructure.

Embodiments of the present disclosure provide various optimizations to video storage, transmission, and display technology, including spline interpolation, motion prediction, and byte-level instruction encoding. Spline interpolation refers generally to the storage of parameters of a curve or shape, and executing an interpolation function based on the parameters to generate the curve or shape. Motion prediction refers generally to predicting a future path of a writing instrument operated by a user based on present and past motion of the writing instrument and based on a database storing human cursor movement data. Byte-level instruction encoding refers generally to the lossless conversion of a text-based file to a byte-based file.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Figure 2:
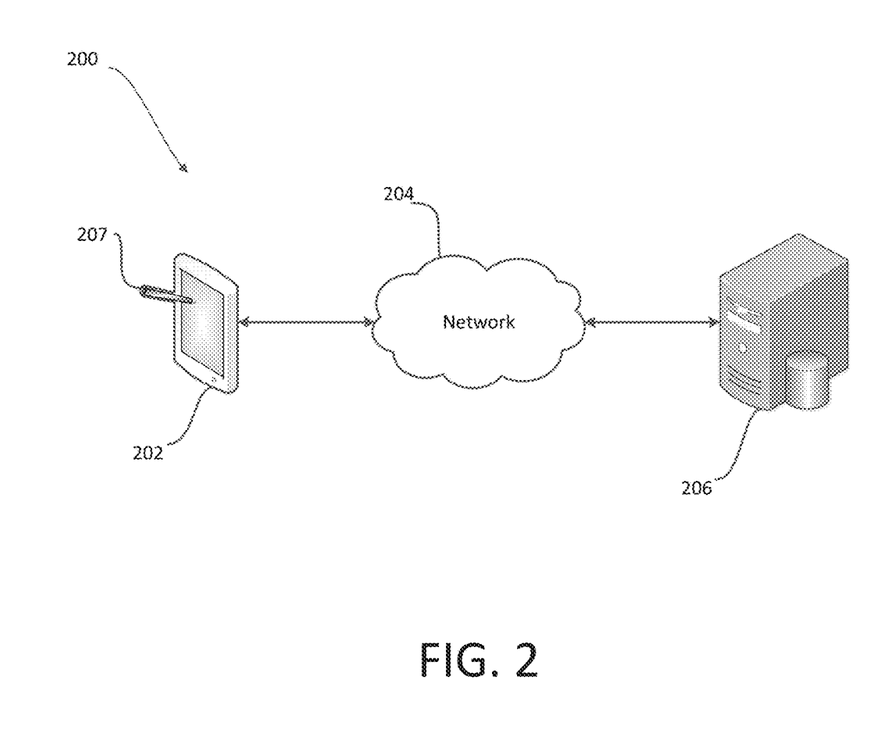
FIG. 2 illustrates a diagram of a computer in communication with a server according to an embodiment.

FIG. 2 illustrates a video generation environment 200. The environment 200 includes a tablet computer 202, a network 204, and a server 206. The tablet computer 202 and the server 206 are configured to communicate via the network 204. For example, the network 204 may be a wired or wireless network through which information may be exchanged between the tablet computer 202 and the server 206.

The tablet computer 202 is generally configured to provide an environment in which chalkboard-style videos may be created, and is discussed in greater detail below with respect to FIG. 3. For example, the tablet computer 202 may be configured to receive input information from a stylus 207. In another example, the tablet computer 202 may be configured to receive input information from a user applying a finger to a touch screen 208. A user may use the stylus 207 or a finger to write information which appears in the chalkboard-style video. For example, the user may use the stylus 207 to write out, and solve, a mathematical equation.

The server 206 is generally configured to compile chalkboard-style videos in a desired format and distribute the compiled videos to one or more consumers, as discussed in greater detail below with respect to FIG. 5. For example, the tablet computer 202 may send information indicative of the video content to the server 206. The server 206 may compile the information into a file format that requires less storage than the original format. The server 206 may subsequently distribute the file including the video content to consumers, such as students in developing countries.

Figure 3:
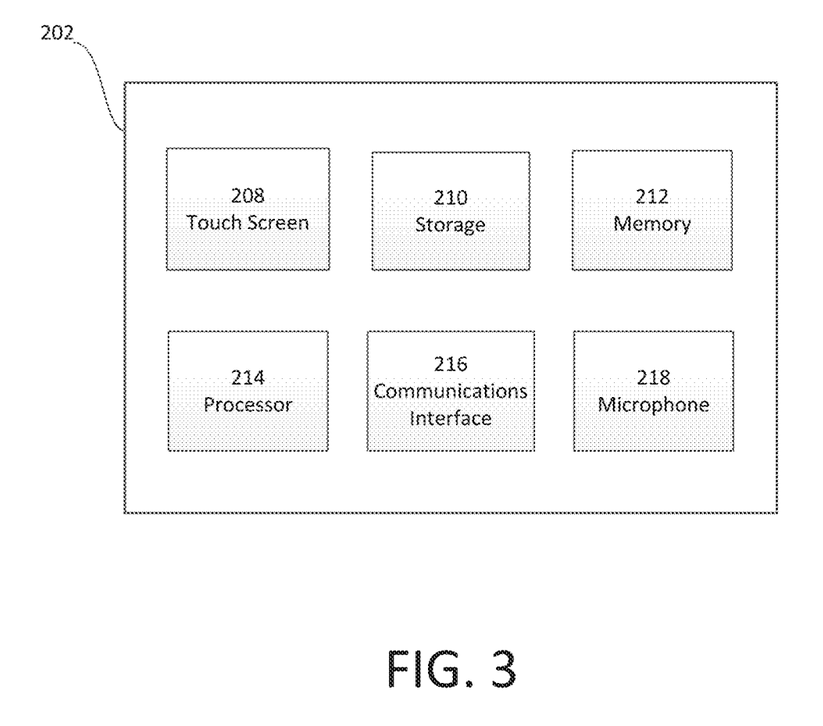
FIG. 3 illustrates a block diagram of a tablet computer according to an embodiment.

FIG. 3 illustrates a block diagram of the tablet computer 202 according to an embodiment. In some embodiments, the tablet computer 202 may be used by a user to create a chalkboard-style video. The tablet computer 202 includes a touch screen 208, storage 210, memory 212, a processor 214, a communications interface 216, and a microphone 218.

The touch screen 208 is generally configured to provide output information to, and receive inputs from, a user. For example, the tablet computer 202 may receive a touch input from a user selecting a video icon displayed on the touch screen 208, and the tablet computer 202 may provide an output to a user by displaying the selected video on the touch screen 208.

The storage 210 may include a computer-readable and/or -writable nonvolatile medium in which signals may be stored to provide a program executed by the processor 214. The storage 210 may include one or more of a disk or flash memory, and in some examples may include RAM or other non-volatile memory such as EEPROM. In some embodiments, the processor 214 may cause data to be read from the nonvolatile medium into the memory 212 to allow for faster access to information by the processor 214. For example, the memory 212 may include volatile memory such as DRAM, SRAM, and so forth.

The processor 214 is generally configured to manipulate and/or execute data contained at least within the storage 210 and memory 212. For example, the processor 214 may execute a chalkboard-style video creation program through which a user may create a chalkboard-style video.

The communications interface 216 is generally configured to enable communication with one or more external devices. For example, the communications interface 216 may receive information from, or provide information to, the server 206 via the communications interface 216. The microphone 218 is generally configured to receive audio signals. For example, the microphone 218 may receive speech signals from a user. The speech signals may subsequently be stored, for example, in the storage 210.

Figure 4:
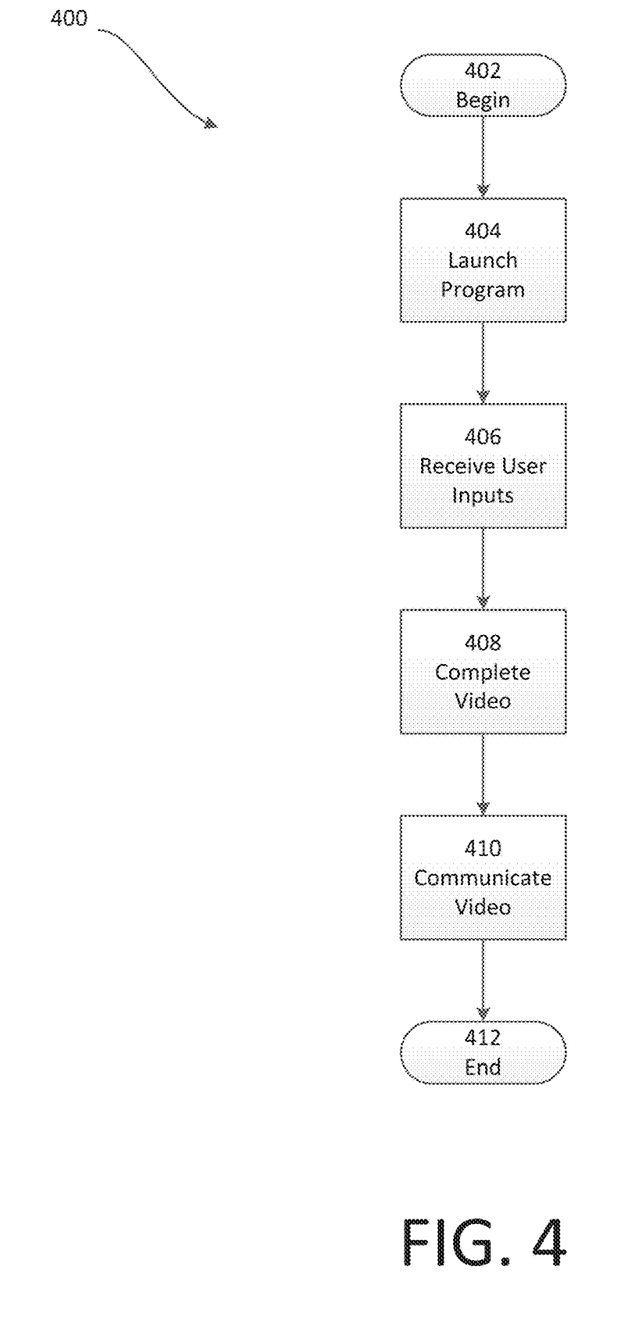
FIG. 4 illustrates a flow diagram of a video creation process according to an embodiment.

FIG. 4 illustrates a process 400 for generating a chalkboard-style video. For example, the process 400 may be executed by the tablet computer 202. The process 400 includes acts of launching a video creation program 404, receiving user inputs 406, completing a video 408, and communicating the video 410.

At act 402, the process 400 begins. At act 404, the video creation program 404 is launched. For example, the tablet computer 202 may launch the video creation program responsive to receiving a user input selecting the video creation program. At act 406, user inputs are received. The user inputs may include alphanumeric characters drawn on the touch screen 208. The user inputs may also include audio signals received by the microphone 218.

For example, if a video is directed to educating viewers about mathematical fractions, the touch screen 208 may receive inputs from the stylus 207 representing numerical characters, equations, and relationships, while the microphone 218 simultaneously receives audio signals from a user narrating and explaining the content being drawn.

At act 408, the creation of the video is completed. For example, the tablet computer 202 may receive an input from a user selecting a "complete video" icon displayed on the touch screen 208. At act 410, one or more data signals representing the video are communicated to an external entity. For example, the tablet computer 202 may communicate the one or more data signals to the server 206 via the communications interface 216. At act 412, the process 400 ends.

Accordingly, the tablet computer 202 may be configured to provide an input environment through which a user may create an educational chalkboard-style learning video. The tablet computer 202 may execute a chalkboard-style learning video creation program designed to facilitate the generation of a chalkboard-style learning video. Upon completion, the tablet computer 202 may be configured to communicate one or more data signals including the generated chalkboard-style learning video, which may include one or more audio signals, to an external entity such as the server 206.

Although the example illustrated in connection with the process 400 is directed to the tablet computer 202, the process 400 may be executed by alternate computing devices. For example, the process 400 may be executed by a personal computer. In some embodiments, rather than receiving touch inputs at act 406, a personal computer may receive mouse or keyboard inputs at the act 406. The personal computer may still receive audio inputs from, for example, a microphone connected to the personal computer.

Figure 5:
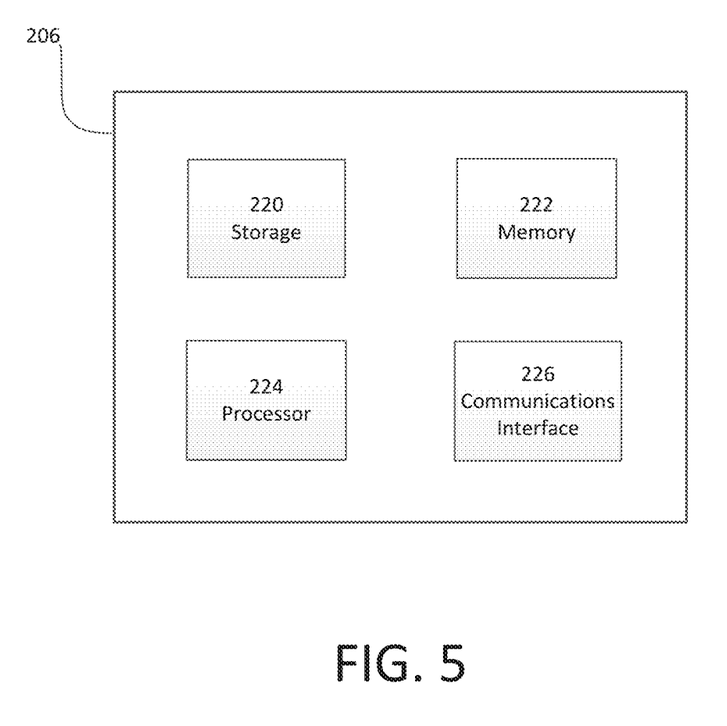
FIG. 5 illustrates a block diagram of a server according to an embodiment.

FIG. 5 illustrates a block diagram of the server 206 according to an embodiment. In some embodiments, the server 206 may receive one or more data signals representing video content (for example, audio and visual signals) from a computer, such as the tablet computer 202, and compile the video content in an ultra-data-light format. Generally speaking, an ultra-data-light format refers to a format having minimal storage requirements. The server 206 includes storage 220, memory 222, a processor 224, and a communications interface 226.

The storage 220 may include a computer-readable and/or -writable nonvolatile medium in which signals may be stored to provide a program executed by the processor 224. The storage 220 may include one or more of a disk or flash memory, and in some examples may include RAM or other non-volatile memory such as EEPROM. In some embodiments, the processor 224 may cause data to be read from the nonvolatile medium into the memory 222 to allow for faster access to information by the processor 224. For example, the memory 222 may include volatile memory such as DRAM, SRAM, and so forth.

The processor 224 is generally configured to manipulate and/or execute data contained at least within the storage 220 and memory 222. For example, as discussed in greater detail below with respect to FIG. 6, the processor 224 may execute a chalkboard-style video compilation program to compile chalkboard-style learning videos in an ultra-data-light format with minimal storage requirements.

The communications interface 226 is generally configured to facilitate communication with one or more external entities. For example, the server 206 may receive one or more data signals indicative of a chalkboard-style learning video from the tablet computer 202 via the communications interface 226. Subsequent to formatting the video, the server 206 may provide the video to one or more recipients (for example, computers operated by students desiring to learn the contents of the video) via the communications interface 226.

Figure 6:
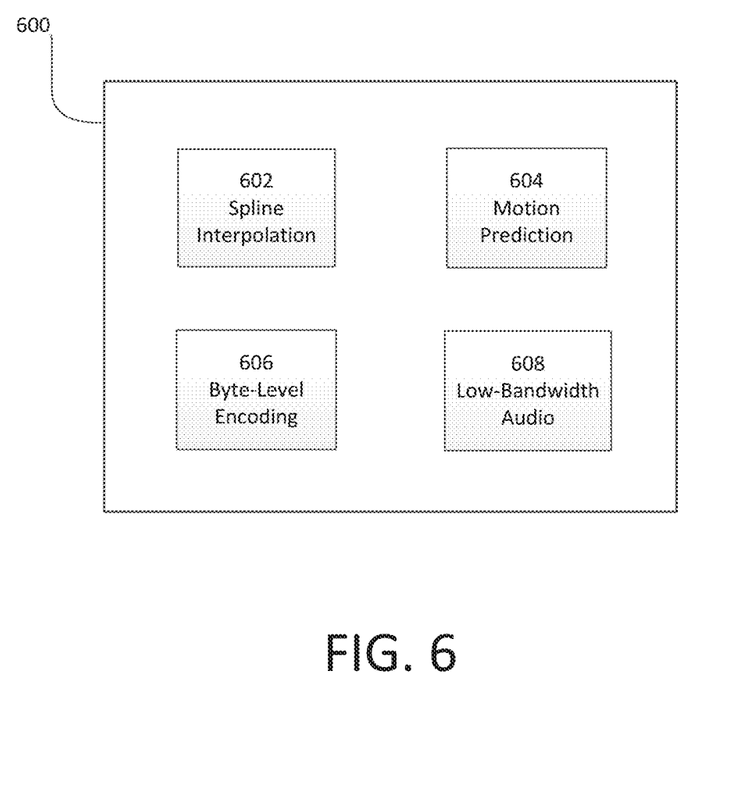
FIG. 6 illustrates a block diagram of chalkboard-style video generation features according to an embodiment.

FIG. 6 illustrates a block diagram of features of a chalkboard-style video compilation program 600 according to an embodiment. For example, the program may be executed by the processor 224 of the server 206 on one or more data signals received from the tablet computer 202 via the communications interface 226 of the server 206. The program 600 includes a spline interpolation feature 602, a motion prediction feature 604, a byte-level encoding feature 606, and a low-bandwidth audio feature 608.

The spline interpolation feature 602 will now be discussed in greater detail. Interpolation refers generally to the construction of a set of new data points based on a set of known data points. A spline may refer to a piecewise polynomial parametric curve. In at least one embodiment, the spline interpolation feature 602 generally refers to the transformation of a set of data points to a less-memory-intensive set of data points, and the subsequent generation of a spline curve from the reduced set of data points. An example of spline interpolation is illustrated below with respect to FIGS. 7A and 7B.

Figure 7A:
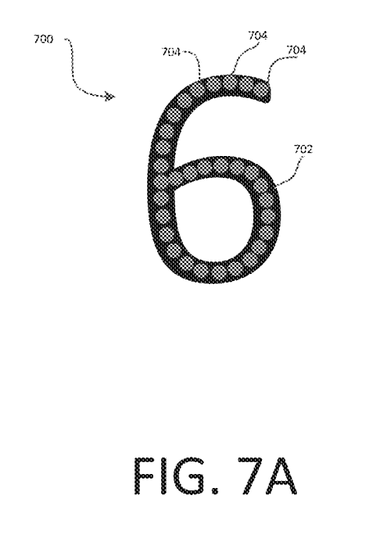
FIG. 7A illustrates a representation of a stored character according to an embodiment.

FIG. 7A illustrates a displayed character 700 representing the number "6." The character 700 is represented by a curve 702 connecting a plurality of data points 704. In the context of a .lrn file, which describes a video parametrically, a plurality of data points may be stored to encode characters to be displayed. For example, the tablet computer 202 may determine the plurality of data points as corresponding to a position of a stylus on the touch screen 208 polled at a specified frequency. The plurality of data points 704 may subsequently be communicated via the communications interface 216 of the tablet computer 202 to the communications interface 226 of the server 206.

Generally speaking, the fidelity of the reproduced image increases in proportion with the number of stored data points. However, the storage requirements for the stored data points also increase in proportion with the number of stored data points. Accordingly, while the curve 702 reproduces the number "6" with high fidelity, significant storage resources are required to store the plurality of data points.

Figure 8:
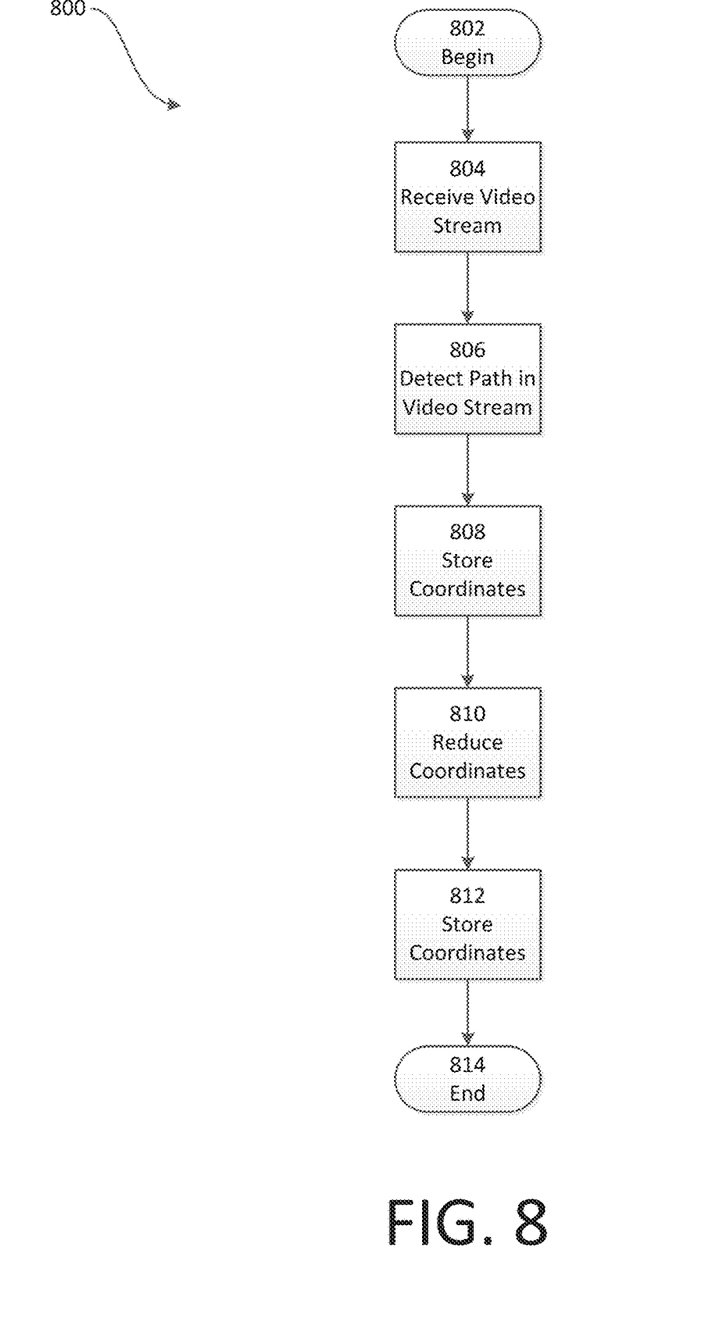
FIG. 8 illustrates a flow diagram of a video encoding process according to an embodiment.

FIG. 8 illustrates a process 800 of reducing a number of stored data points representing a displayed character according to an embodiment. For example, the process 800 may be executed by the server 206 in connection with the plurality of data points 704. The process 800 includes acts of receiving a video stream including a plurality of data points 804, detecting a path in the video stream 806, storing the plurality of data points representing the path 808, reducing the plurality of data points 810, and storing the reduced plurality of data points 812.

At act 802, the process 800 begins. At act 804, a video stream including a plurality of data points is received. For example, the server 206 may receive a video stream from the tablet computer 202. The plurality of data points may represent a character drawn on the tablet computer 202 with a stylus, for example. At act 806, a path is detected in the video stream. For example, the path may connect the plurality of data points to reproduce the character drawn on the tablet computer 202.

At act 808, the plurality of data points is stored. For example, each data point of the plurality of data points may be stored as a set of coordinates in a memory (for example, the memory 222) or a storage (for example, the storage 220). The set of coordinates may include a horizontal position coordinate, a vertical position coordinate, and a time coordinate. The horizontal position coordinate may represent a position on a drawing surface along a horizontal axis. The vertical position coordinate may represent a position on a drawing surface along a vertical axis. The time coordinate may represent an absolutely or relative time at which the data point was generated and/or should be generated during playback. As each data point is stored as a set of coordinates, the plurality of data points is stored as a plurality of coordinate sets. For example, the plurality of coordinate sets may be stored in a text-based file, such as an XML file.

At act 810, the plurality of coordinate sets is reduced. For example, reducing the plurality of coordinate sets may include removing one or more coordinate sets to reduce the number of coordinate sets. Reducing the plurality of coordinate sets according to one embodiment is discussed in greater detail with respect to FIG. 9. At act 812, the reduced plurality of coordinate sets is stored for subsequent distribution. At act 814, the process 800 ends.

Figure 7B:
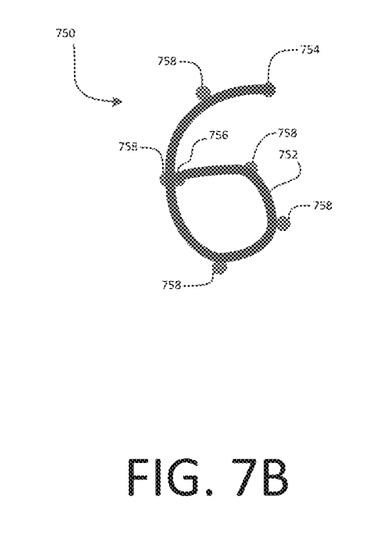
FIG. 7B illustrates a representation of a stored character with reduced storage requirements according to an embodiment.

FIG. 7B illustrates a displayed character 750 representing the number "6" and encoded by a reduced plurality of coordinate sets according to an embodiment. For example, if the process 800 is executed in connection with the displayed character 700 illustrated in FIG. 7A, the coordinates of the displayed character 750 may represent the result of the process 800.

The displayed character 750 includes a curve 752, a first data point 754, a last data point 756, and a plurality of intermediate data points 758. The curve 752 may represent a spline curve generated by a spline interpolation function executed in connection with the data points 754-758. Although the curve 752 reproduces the number "6" with slightly reduced fidelity as compared to the curve 702, the data points 754-758 have significantly lower storage requirements as compared to the plurality of data points 704.

Figure 9:
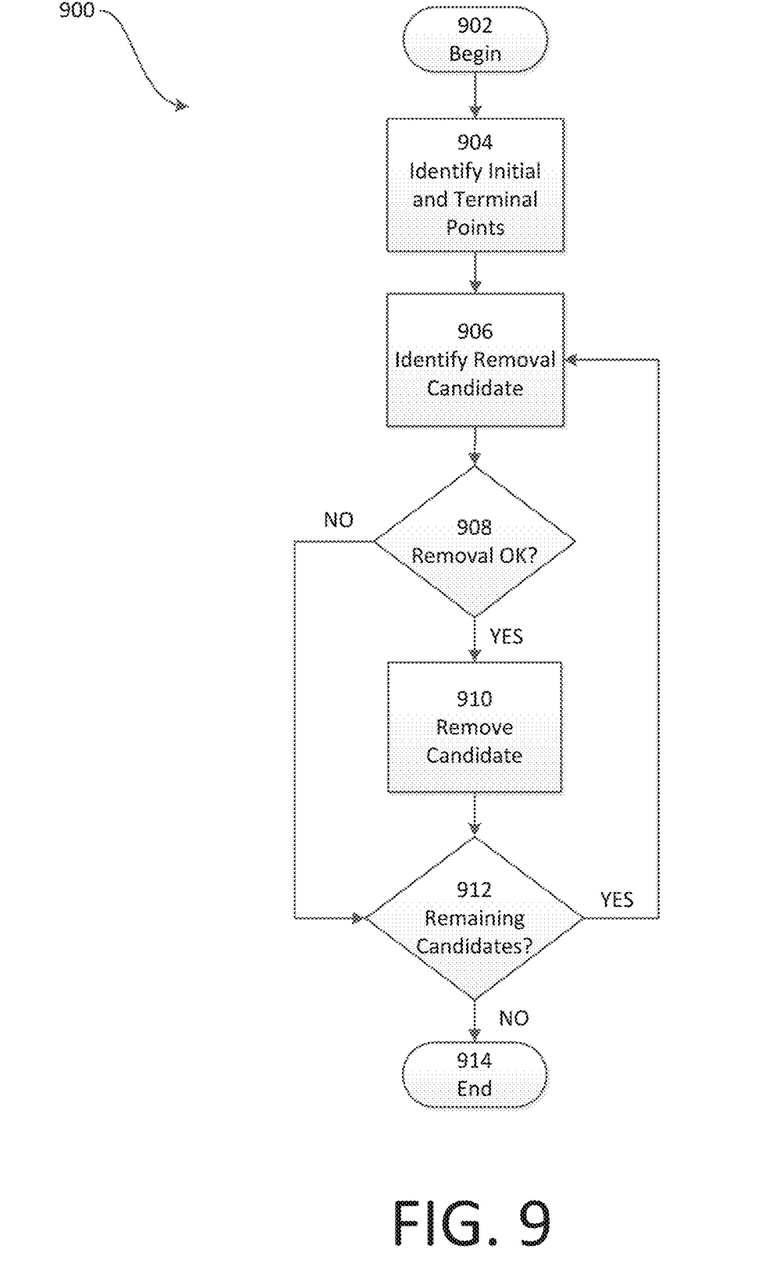
FIG. 9 illustrates a flow diagram of a coordinate reduction process according to an embodiment.

FIG. 9 illustrates a process 900 of reducing a plurality of coordinate sets according to one embodiment. For example, the process 900 may be executed by the server 206 in connection with act 810 of the process 800. The process 900 includes acts of identifying an initial and terminal data point 904, identifying at least one data point to be removed 906, verifying that the at least one data point should be removed 908, removing the at least one data point 910, and determining if any additional data points should be removed 912.

At act 902, the process 900 begins. At act 904, an initial data point and a terminal data point representing a character are identified. For example, the first coordinate 754 may represent the initial data point of the character 750 and the last coordinate 756 may represent the terminal data point of the character 750.

In some embodiments, an initial data point may be identified as an initial point at which the stylus 207 makes contact with the touch screen 208 of the tablet computer 202. Similarly, the terminal data point may be identified as a final location on the touch screen 208 that the stylus 207 contacts before being lifted off of the touch screen 208. Each character drawn on the touch screen 208 may be automatically segmented based on the application and removal of the stylus 207 on the touch screen 208.

At act 906, at least one data point is identified as a candidate for removal. In some embodiments, a data point other than the initial data point and the terminal data point may be randomly selected as a candidate for removal. In other embodiments, a data point other than the initial data point and the terminal data point which leads to the greatest error sum of squares of the plurality of data points is identified as a candidate for removal. In still other embodiments, other methods may be implemented to identify a candidate for removal.

At act 908, a determination is made as to whether removing the candidate for removal is acceptable. If it is determined that removing the candidate for removal is acceptable (908 YES), then the process 900 continues to act 910. Otherwise, if it is determined that removing the candidate for removal is unacceptable (908 NO), then the process 900 continues to act 912.

Determining whether the removal is acceptable may include determining whether the remaining data points represent a character to a degree of accuracy within acceptable limits. For example, determining whether the removal is acceptable may include comparing a path length of a spline curve interpolated from the plurality of data points including the candidate for removal to a path length of a spline curve interpolated from the plurality of data points without the candidate for removal. If the difference between the path lengths exceeds a specified maximum, then a determination is made that removing the candidate for removal is unacceptable. For example, the specified maximum may be a path length difference of 5% or greater.

At act 910, responsive to determining that the removal of the candidate for removal is acceptable (908 YES), the candidate for removal is removed. For example, removing the candidate for removal may include deleting a coordinate set corresponding to the candidate for removal.

At act 912, a determination is made as to whether the plurality of data points includes any additional candidates for removal. If there are additional candidates for removal (912 YES), then the process 900 returns to act 906. If there are no additional candidates for removal (912 NO), then the process ends at act 914. For example, determining that there are no additional candidates for removal may include determining that the removal of any remaining data point would be unacceptable.

The motion prediction feature 604 will now be discussed in greater detail. In some embodiments, the motion prediction feature 604 may be executed in real-time as one or more characters are being drawn. The motion prediction feature 604 may be executed concurrently with the spline interpolation function 602.

Although the spline interpolation function 602 may be particularly advantageous when executed in connection with data points representing characters with substantially curved vertices, spline interpolation may be less effective when executed in connection with data points representing characters with sharply-angled vertices. For example, the letter "v" has a sharply-angled vertex at the lowermost point of the letter. It may be difficult to encode the letter "v" without a relatively large number of data points if only spline interpolation is implemented.

The motion prediction feature 604 may enable further reductions in storage requirements where the spline interpolation function 602 is less effective by predicting future data points based on present and past data points using predictive models of human cursor movements. The motion prediction feature 604 may be executed to determine, based at least on the position, velocity, and acceleration of the stylus, that a specific alphanumeric character is being drawn. For example, the motion prediction feature 604 may determine that the letter "v" is being drawn based on the angle at which the stylus approaches the vertex of the "v," and based on a deceleration of the stylus as it approaches the vertex of the "v" using the predictive models of human cursor movements.

The motion prediction feature 604 enables significant reductions in storage requirements at least because the motion prediction feature 604 enables a character to be predicted based only on an initial set of data points. Intermediate data points (i.e., data points which are neither the first data point nor the last data point) may be replaced with motion-predicted estimates, leading to improved character fidelity with reduced storage requirements when executed in connection with the spline interpolation feature 602.

The byte-level encoding feature 606 will now be discussed in greater detail. As discussed above, .lrn video files may be encoded in a text file format. For example, the .lrn video files may be represented by a human-readable XML or JSON file format. An example portion of a .lrn XML file may be as shown:
 "type": "path",
 "width": 1,
 "color":"#ff0000",
 "coord": {
 x: [20, 23, 28, 32, 46, 46, 43, 35, 30, 29],
 y: [290, 255, 176, 183, 144, 202, 209, 245, 203, 29],
 t: [0, 10, 23, 37, 54, 65, 87, 102, 141, 155]
 }
 "start": 1300

As illustrated, the XML file portions may include parameters which describe a shape (for example, a path shape) and an evolution of the shape over time, and may be comprehensible to a human viewer. While the human-readability of the XML and JSON formats may be advantageous in certain situations, though, text files may also require more storage than, for example, strictly machine-readable file formats.

The byte-level encoding feature 606 enables a text-based file to be encoded to a binary or byte level. For example, the byte-level encoding feature 606 may include a standard instruction set including all potential commands and parameters necessary to map a text-based file to a compressed, non-human-readable binary file. In some embodiments, the conversion is lossless and enables data to be mapped between the text-based file format and the byte-level file format without losing any video data. The instruction set may be stored by, or otherwise accessible to, the server 206. In some embodiments, the recipient of the encoded video may execute a software program that allows the recipient to read the encoded video.

Accordingly, by removing the non-numerical portions of the video file, storage requirements for a video file may be reduced significantly as compared to a human-readable, text-based file format. The byte-level encoding feature 606 may be executed on the text-based file generated subsequent to execution of the spline interpolation feature 602 and the motion prediction feature 604, that is, after the spline interpolation feature 602 and the motion prediction feature 604 have compressed an initial text-file format by removing extraneous data points.

The low-bandwidth audio feature 608 will now be discussed in greater detail. The low-bandwidth audio feature 608 refers generally to the storage of one or more audio signals in a format requiring reduced bandwidth. For example, the one or more audio signals may include audio signals of a user speaking into the microphone 218 of the tablet computer 202. The one or more audio signals may be combined with the video file(s) generated in connection with the features 602-606 to yield a video file with extremely reduced storage requirements.

In some embodiments, the video file, which may include the one or more audio signals, may be stored on the server 206 and distributed to one or more external entities for consumption. In other embodiments, the server 206 may communicate the video file to one or more external entities for extended storage. Accordingly, a mechanism for generating, compiling, and distributing ultra-data-light video files has been provided which may be particularly advantageous in the context of generating chalkboard-style educational videos.

Various modifications, additions, and exclusions to the foregoing disclosure may be possible. For example, as discussed above, a desktop or laptop computer may be used in lieu of the tablet computer 202. The desktop or laptop computer may receive mouse inputs in lieu of, or in addition to, physical stylus inputs on a touch screen. For example, a position of a mouse cursor may be representative of a position of a digital stylus.

The motion prediction feature 604 may operate differently depending on whether the input data is received from a physical stylus or a digital stylus. For example, the predictive human cursor movement database may be different for a physical stylus as compared to a digital stylus. Although the foregoing description makes reference to a tablet computer, other drawing surfaces may be employed. For example, a touch-sensitive laptop computer screen may be implemented and may receive touch inputs from, for example, a user's finger or a stylus.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of encoding a media file, the method comprising:
   receiving a video stream depicting a drawing including at least one object being drawn on a drawing surface;
   detecting, in the video stream, at least one path included in the drawing and representing the at least one object;
   storing a plurality of coordinate sets representing the at least one path;
   identifying a first coordinate set of the plurality of coordinate sets;
   executing an interpolation function to determine an interpolated path represented by a subset of the plurality of coordinate sets, the subset of the plurality of coordinate sets not including the first coordinate set;
   determining a path length of the interpolated path;
   determining that the interpolated path represents the at least one path to a degree of accuracy exceeding a defined threshold;
   and
   storing the subset of the plurality of coordinate sets in a text file format.

2. The method of claim 1, wherein storing the plurality of coordinate sets representing the at least one path includes storing one or more of a first position coordinate, a second position coordinate, and a time coordinate.

3. The method of claim 1, wherein executing the interpolation function includes executing a spline interpolation function.

4. The method of claim 3, wherein determining that the interpolated path represents the at least one path to the degree of accuracy exceeding the defined threshold includes:
   determining that the path length of the interpolated path satisfies a first criterion.

5. The method of claim 4, wherein determining that the path length of the interpolated path satisfies the first criterion includes determining that the path length of the interpolated path is within a threshold range from a path length of the at least one path.

6. The method of claim 1, wherein identifying the first coordinate set includes identifying at least one coordinate set which produces a greatest sum of squared errors of the plurality of coordinate sets.

7. The method of claim 1, wherein the at least one object is drawn by a stylus and the at least one path is a path traveled by the stylus.

8. The method of claim 7, further comprising executing a motion prediction function to predict the at least one path drawn by the stylus.

9. The method of claim 1, further comprising converting the text file format to a binary file format.

10. The method of claim 1, wherein the text file format is one of an XML file format and a JSON file format.

11. A non-transitory computer-readable medium storing sequences of computer-executable instructions for encoding a media file, the sequences of computer-executable instructions including instructions that instruct at least one processor to:
    receive a video stream depicting a drawing including at least one object being drawn on a drawing surface;

detect, in the video stream, at least one path included in the drawing and representing the at least one object;

store a plurality of coordinate sets representing the at least one path;

identify a first coordinate set of the plurality of coordinate sets;

execute an interpolation function to determine an interpolated path represented by a subset of the plurality of coordinate sets, the subset of the plurality of coordinate sets not including the first coordinate set;

determine a path length of the interpolated path;

determine that the interpolated path represents the at least one path to a degree of accuracy exceeding a defined threshold; and store the subset of the plurality of coordinate sets in a text file format.

12. The non-transitory computer-readable medium of claim 11, wherein storing the plurality of coordinate sets representing the at least one path includes storing one or more of a first position coordinate, a second position coordinate, and a time coordinate.

13. The non-transitory computer-readable medium of claim 11, wherein executing the interpolation function includes executing a spline interpolation function.

14. The non-transitory computer-readable medium of claim 13, wherein determining that the interpolated path represents the at least one path to the degree of accuracy exceeding the defined threshold includes determining that the path length of the interpolated path satisfies a first criterion.

15. The non-transitory computer-readable medium of claim 14, wherein determining that the path length of the interpolated path satisfies the first criterion includes determining that the path length of the interpolated path is within a threshold range from a path length of the at least one path.

16. The non-transitory computer-readable medium of claim 11, wherein identifying the first coordinate set includes identifying at least one coordinate set which produces a greatest sum of squared errors of the plurality of coordinate sets.

17. The non-transitory computer-readable medium of claim 11, wherein the at least one object is drawn by a stylus and the at least one path is a path traveled by the stylus.

18. The non-transitory computer-readable medium of claim 17, wherein the sequences of computer-executable instructions include instructions which are further configured to instruct the at least one processor to execute a motion prediction function to predict the at least one path drawn by the stylus.

19. The non-transitory computer-readable medium of claim 11, wherein the sequences of computer-executable instructions include instructions which are further configured to instruct the at least one processor to convert the text file format to a binary file format.

20. The non-transitory computer-readable medium of claim 11, wherein the text file format is one of an XML file format and a JSON file format.

* * * * *